Patented June 24, 1947

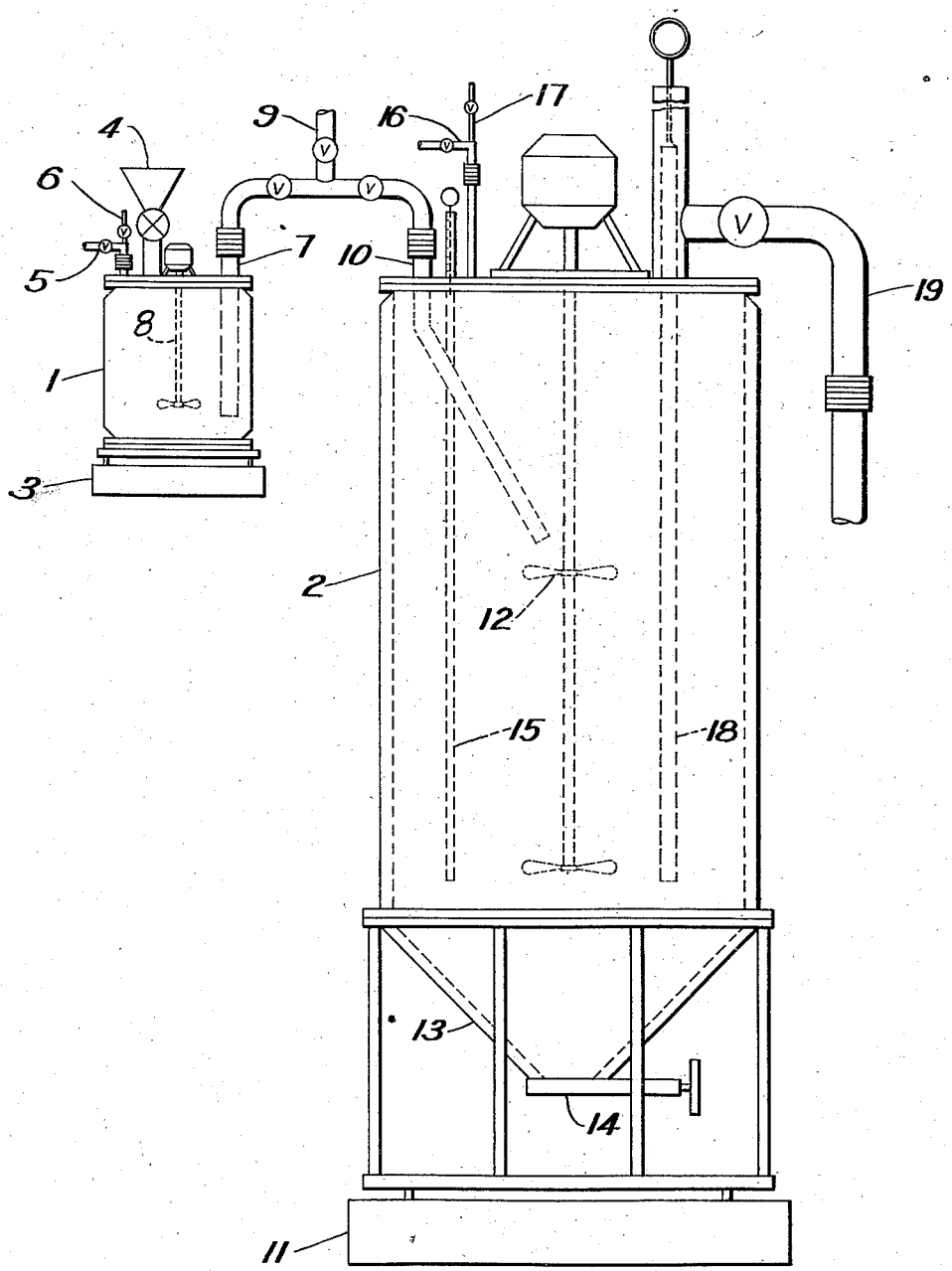

2,422,907

UNITED STATES PATENT OFFICE 2,422,907

PURIFICATION OF ACID POTASSIUM FLUORIDES

Paul R. Johnson, Claymont, Del., assignor to the United States of America, as represented by the Director of the Office of Scientific Research and Development Application January 30, 1945, Serial No. 575,321

7 Claims. (Cl. 23—88)

This invention relates to the purification of acid potassium fluorides and is particularly concerned with the purification of substantially anhydrous acid potassium fluoride electrolytes employed in the manufacture of fluorine in iron or steel electrolytic cells.

Acid potassium fluoride electrolytes employed for the manufacture of fluorine may contain HF and KF in molecular proportions between 1:1 and 3:1, based on a molecular weight of 20 for HF. For operation at low and moderately elevated temperatures a ratio of HF to KF of 1.8:1 or 2:1 may be used to advantage. Sometimes a small proportion (2% or 3%) of lithium fluoride is added to improve cell operation.

When such electrolytes are employed in electrolytic cells constructed of iron or steel, the corrosive action of the electrolyte and generated fluorine gradually dissolves some of the iron from the equipment and this iron contaminates the electrolyte. Continued operation of the cell builds up the iron concentration until the total iron content of the electrolyte may be as much as 6% or 7% or more by weight. The presence of the iron increases the viscosity of the electrolyte and, as a consequence, interferes with proper temperature control and reduces the current efficiency of the cell. It seriously increases the rate of corrosion of iron cell parts and increases the electrolyte dust or mist content of the gases generated by the cell. Since the hydrogen fluoride concentration of cell electrolyte is customarily determined by a titration in which the iron masquerades as acid, large variations in the iron content render these determinations unreliable.

The present invention has for its object the removal of iron present in acid potassium fluorides. A further object of the invention is the removal of iron by a process which produces directly an anhydrous acid potassium fluoride suitable for use as cell electrolyte in the manufacture of fluorine.

In accordance with the invention an acid potassium fluoride composition containing iron as an impurity is treated in molten condition with a small proportion of a sodium fluoride and the resulting precipitate, containing the iron as well as the added sodium salt, is separated by a mechanical separation method, such as filtration, decantation, or centrifugation.

By the process of the invention an acid potassium fluoride cell electrolyte containing as much as 10% of iron may be purified to an iron content of a few tenths of one per cent. Used cell electrolytes may contain suspended iron and other suspended metallic impurities as well as dissolved iron. Not only does the process of the present invention remove dissolved iron but, at the same time, it eliminates suspended impurities such as insoluble salts of copper and nickel, and undissolved iron salts which may be present in the crude acid potassium fluoride. Although these suspended impurities can be removed, at least in part, by settling or centrifuging, they are removed rapidly and completely when a sodium fluoride has been added to the electrolyte to precipitate the dissolved iron.

While I do not intend to limit my invention to any particular theory of operation, I believe that the sodium fluoride reacts with dissolved ferric fluoride to form a triple salt,

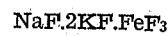

$NaF.2KF.FeF_3$ which is insoluble in the acid potassium fluoride. The resulting precipitate probably carries down other solid material too finely divided to settle out alone.

In carrying out the process of the invention it is necessary to add only sufficient sodium acid fluoride or sodium fluoride to provide one atom of sodium for each atom of iron present in the impure material.

The temperature of treatment should be sufficient to maintain the acid potassium fluoride in a fluid condition. For the treatment of electrolytes containing HF and KF in molecular ratios of about 1.8:1 temperatures from 90° C. to 160° C. have been found to be satisfactory. If temperatures at which substantial quantities of hydrogen fluoride are evolved from the crude material at normal pressure are employed, elevated pressures may be used to prevent loss of the hydrogen fluoride.

The settling of the iron is quite uniform so that a fairly sharp line of demarkation between clear and contaminated liquid is maintained. The yield of purified product is dependent upon the settling time and, in the case of centrifugation, the force applied.

In general it is preferable to avoid an increase of iron concentration in cell electrolyte to a high value, and whenever the iron content of the electrolyte approaches a value of 3%, it is desirable to refine the electrolyte to an iron concentration of less than ½%.

When sodium fluoride or sodium acid fluoride is added to a molten acid potassium fluoride electrolyte, there is a tendency for the sodium salt to become lumpy; hence it is expedient to mix the sodium salt with 2 or 3 times its weight of molten acid potassium fluoride until any lumps are broken up and a uniform slurry is obtained, and to use this slurry for treating the iron-containing acid potassium fluoride. Since this lumping tendency is slightly less with sodium acid fluoride than with the normal salt, I prefer to use the acid salt.

In the attached drawing an apparatus for carrying out the purification process of the invention is illustrated.

This apparatus comprises a small premixer 1 and a large reactor and settling tank 2. The premixer 1 is a steam-jacketed tank mounted on platform scales 3. It is provided with a sodium acid fluoride inlet 4, air pressure line 5, gas vent 6, charging and discharging line 7, and an efficient agitator 8. Line 7 is connected to inlet 9 for crude electrolyte and line 10 leading to reactor 2. Reactor 2 also is steam-jacketed and is mounted on scales 11. The discharge end of line 10 is located close to an efficient agitator 12 in order to insure prompt and thorough mixing of the liquid in reactor 2 with sodium acid fluoride slurry. Reactor 2 has a hopper bottom 13 with a discharge valve 14 for removing solid matter. This reactor is equipped with a thief 15 for sampling its contents and thus determining the level of solids in the tank. An air line 16 and vent 17 are provided for use in discharging the liquid contents from the reactor by way of an adjustable outlet 18 capable of withdrawing liquid from any desired level in the tank. This adjustable outlet connects with conduit 19 leading to suitable storage or to a manifold for filling the electrolytic cells.

All liquid and gas lines are provided with suitable valves and flexible unions, if necessary, to permit unhindered movement of the tanks with the scale platforms. The liquid lines either should be adequately insulated or should be provided with steam jacketing or chasing (not shown). Other conventional items, such as temperature indicators, service lines, and so forth, have been omitted for the sake of simplicity.

In the operation of the apparatus illustrated, tank 1 is charged with molten acid potassium fluoride electrolyte at a temperature of about 100° C. by way of lines 9 and 7. The agitator 8 is started and sufficient sodium acid fluoride is introduced to provide a slurry consisting of about two parts of the acid potassium fluoride electrolyte for each one part of sodium acid fluoride. The sodium acid fluoride is added slowly to prevent lumping.

While this pre-mixing of the reagent is taking place, the main bulk of crude electrolyte is introduced through lines 9 and 10 to reactor 2. The temperature of the electrolyte in both tanks is maintained at approximately 100° C. by the steam jackets.

The iron content of the electrolyte is determined by analysis of a sample. Sufficient sodium hydrogen fluoride slurry is then introduced into the reactor from tank 1 to provide a very slight excess of the sodium salt on the basis that one atom of sodium is necessary to precipitate one atom of iron. The discharge of the slurry from tank 1 into tank 2 is effected by the pressure of air admitted at 5. During this operation the vent line 17 is open to permit gas to escape from reactor 2, and agitator 12 is kept in motion. After the desired amount of the slurry has been added, agitation is continued for an hour or so in order to insure complete contact of the solid sodium acid fluoride with all portions of the crude electrolyte.

When the contents of the reactor have been thoroughly mixed, stirring is discontinued and the contents of reactor 2 are permitted to settle at constant temperature. Settling may be continued for a sufficient period to provide any desired proportion of clear supernatant acid potassium fluoride. In general periods of 24 hours or longer are desirable. Thus in settling tests a period of 16 hours was found in one case to provide a 60% yield of clear acid potassium fluoride, whereas a 40 hour period gave a 75% yield and a 312 hour period an 86% yield. The line of demarkation between clear liquid and liquid containing suspended solids is well defined and may be determined readily by withdrawing one or two samples with thief 15. When the desired degree of settling has been effected, the adjustable outlet 18 is moved to a position such that its lower end is substantially above the settled sludge. With vent 17 closed, air is admitted at 16 to force the purified acid potassium fluoride from the tank. It may be conducted directly to an electrolytic cell or to storage. Make-up potassium fluoride may be added to replace that lost as a component of the sludge. The outlet 18 may be adjusted so as to draw off liquid from near the top of the tank at the start and may be gradually lowered as the liquid level in the tank becomes lower. The liquid level in the tank may be accurately determined from the change in weight as the tank is exhausted.

When the purified product has been removed, the air valve is closed and the valve on vent line 17 is opened. The solid contents of the tank are then removed from hopper 13 by way of discharge valve 14.

*Example 1*

A used acid potassium fluoride electrolyte removed from a fluorine cell was analyzed and found to contain 42% hydrogen fluoride, 4.3% iron, 2.3% nickel, and 0.6% copper. This electrolyte contained substantial proportions of suspended material, a part of which was permitted to settle out. The resulting liquid still contained a visible suspension of solid matter in very finely divided form.

255 grams of this settled electrolyte, which contained approximately 4.2% of iron, was mixed with 11.9 grams of $NaHF_2$ until the $NaHF_2$ was thoroughly dispersed in the electrolyte. The mixture was then settled for 22 hours. During the mixing and settling the temperature was maintained at 90° C. At the end of the 22 hour settling period, 84 grams of clear electrolyte was drawn off from above the suspension concentrated in the lower part of the liquid mass and separated from the clear liquid by a rather sharp line of demarkation. The clear liquid was analyzed and found to contain 49% hydrogen fluoride, 0.28% iron, 0.14% nickel, and 0.14% copper. The residual suspension was treated with 300 cc. of hot water and filtered. The filter-cake was washed with water until neutral to Congo red and then dried. 40 grams of dry solid was obtained containing 17.6% iron, 33% potassium, and 8.7% sodium.

*Example 2*

The same electrolyte as treated in Example 1 was settled until a clear liquid was obtained. This clear liquid contained 43% hydrogen fluoride and 3.3% iron. 126 grams of the clear liquid was thoroughly mixed with 5.9 grams of NaHF₂ and the mixture was settled for 22 hours at 90° C. At the end of the settling period, 46 grams of clear decantate was withdrawn and analyzed. It was found to contain 45% hydrogen fluoride, 0.45% iron, 0.00% nickel, and 0.08% copper. The water-insoluble fraction of the residue, recovered as in Example 1, contained 18.4% iron, 29% potassium, and 9.3% sodium.

*Example 3*

A used electrolyte of acid potassium fluoride contained 44% hydrogen fluoride and 1.3% iron. 247 grams of this electrolyte was mixed with 2.4 grams of NaF. The lumps in the mixture were crushed and the resulting solid thoroughly dispersed in the liquid. After 16 hours 136 grams of clear liquid was decanted from the suspension. The clear liquid upon analysis was found to contain 42% hydrogen fluoride and 0.16% iron. The residual suspension was allowed to settle 24 hours longer and at the end of this period 26 grams more of clear liquid was decanted. The remaining suspension was allowed to settle for two weeks, at the end of which all but 50 grams was recovered in the form of clear electrolyte. About $\tfrac{9}{10}$ of the iron in the original electrolyte remained in the 50 grams of sludge.

*Example 4*

A used electrolyte containing between 1% and 2% suspended solids at 90° C. was analyzed and found to have the following composition:

|  | Per cent |
|---|---|
| Hydrogen fluoride | 44 |
| Potassium fluoride | 51.6 |
| Iron | 3 |
| Nickel | 1.3 |
| Total dissolved iron | 2.5 |

163 grams of this electrolyte was divided into a small portion comprising about 10 grams and a large portion comprising about 153 grams. The 10-gram portion was mixed with 5.5 grams of NaHF₂ to obtain a uniform slurry; the balance of the sample was then added gradually to this slurry while it was vigorously agitated at a constant temperature of 90° C. 144 grams of the hot slurry was charged to a centrifuge and centrifuged to provide 87 grams of clear liquid which upon analysis was found to contain 45.8% HF, 0.4% iron, and 0.1% sodium.

*Example 5*

1267 grams of the same electrolyte as employed in Example 4 was placed in a copper flask. 100 grams of this material was withdrawn and slurried with 41.8 grams of NaHF₂ at 100° C. Meanwhile the remaining 1167 grams of electrolyte was heated to 150° C. The slurry was then added gradually to the main portion of the electrolyte while the latter was agitated at 150° C. The mixture was then cooled in a period of about an hour to 100° C. The liquid contents of the flask were then poured into a settling vessel; 125 grams of heavy sludge remained in the flask. The bulk of the slurry was settled for 16 hours at 100° C. The clear liquid at the top of the liquid mass was then sampled and found to contain 45% HF and 0.58% iron. After 22 hours the clear liquid, amounting to 680 grams, was poured off and analyzed. It was found to contain 46% HF and 0.66% iron.

*Example 6*

7800 lbs. of used acid potassium fluoride electrolyte containing 44.5% hydrogen fluoride and 2.2% iron was charged to a vessel having all the essential features of reactor 2 in the illustration. 220 lbs. of sodium acid fluoride was slurried in 700 lbs. of the electrolyte in a premixer corresponding to tank 1. While agitation was maintained in tank 2, the slurry was transferred to this tank. Agitation was maintained for one and one-quarter hours thereafter. The charge was then allowed to settle. The electrolyte temperature was maintained at about 105° C. during the entire process.

After about 48 hours of settling, approximately 4000 lbs. of clear electrolyte was present. Settling was continued for an additional 24 hours. The adjustable outlet was then set at one inch above the sludge level, and the supernatant electrolyte was transferred to a storage tank. 5300 lbs. of refined electrolyte containing 45.1% hydrogen fluoride, 0.3% iron and 0.29% sodium was obtained.

It will be understood that I intend to include variations and modifications of the invention and that the preceding examples are illustrative only and in no wise to be construed as limitations upon the invention, the scope of which is defined in the appended claims, wherein I claim:

1. The method of removing iron dissolved in molten acid potassium fluoride, which comprises adding a sodium fluoride to the molten salt to precipitate a solid fluoride of sodium and iron and separating the precipitated solid fluoride from the molten salt.

2. The method of removing iron dissolved in molten acid potassium fluoride, which comprises thoroughly mixing a member of the group consisting of solid sodium fluoride and solid sodium acid fluoride with the acid potassium fluoride at a temperature between 90° C. and 160° C. and separating the precipitated solid fluoride of sodium and iron from the molten acid potassium fluoride.

3. The method of removing iron from acid potassium fluoride electrolyte containing between about 1 and about 3 mols of HF for each mol of KF and from about 1% to about 10% of iron, which comprises adding to the molten electrolyte a member of the group consisting of sodium fluoride and sodium acid fluoride in quantity to provide about one atom of sodium for each atom of iron present in the electrolyte, and mechanically separating the resulting solid compound of sodium and iron from the molten electrolyte.

4. The method of removing iron from a molten anhydrous acid potassium fluoride electrolyte containing between about 1 and about 3 mols of HF for each mol of KF and between about 1% and about 10% of iron, which comprises mixing the molten electrolyte with at least sufficient anhydrous sodium acid fluoride to supply about one atom of sodium for each atom of iron present in the electrolyte, settling the mixture to separate the resulting solid compound from the molten electrolyte, and decanting off the molten electrolyte from the settled solids.

5. The method of removing iron from a molten anhydrous acid potassium fluoride electrolyte containing between about 1 and about 3 mols of HF for each mol of KF and between about 1% and about 10% of iron, which comprises mixing the molten electrolyte with anhydrous sodium acid fluoride to supply about one atom of sodium for each atom of iron present in the electrolyte, settling the resulting solid compound, and decanting off clear electrolyte therefrom while maintaining the temperature of the electrolyte between 90° C. and 160° C.

6. The method of removing iron dissolved in molten anhydrous acid potassium fluoride, which comprises forming a slurry of solid sodium acid fluoride suspended in molten acid potassium fluoride, mixing the slurry with molten acid potassium fluoride containing dissolved iron to precipitate a solid fluoride of sodium and iron, and separating the precipitated solid fluoride from the molten salt.

7. The method of removing iron from a molten anhydrous acid potassium fluoride electrolyte containing between about 1 and about 3 mols of HF for each mol of KF and between about 1% and about 10% of iron, which comprises mixing the molten electrolyte with a molten anhydrous acid potassium fluoride slurry of finely divided sodium acid fluoride to supply about one atom of sodium for each atom of iron present in the electrolyte, settling the resulting solid compound, and decanting off clear electrolyte therefrom while maintaining the temperature of the electrolyte between 90° C. and 160° C.

PAUL R. JOHNSON.